(12) United States Patent
Breuls et al.

(10) Patent No.: US 7,394,959 B2
(45) Date of Patent: Jul. 1, 2008

(54) METHOD OF MANUFACTURING AN OPTICAL FIBRE HAVING VARIATIONS IN THE REFRACTIVE INDEX

(75) Inventors: Antonius Henricus Elisabeth Breuls, Urmond (NL); Peter Johannes Theodorus Pleunis, Weert (NL)

(73) Assignee: Draka Comteq B.V., Amsterdam (NL)

( * ) Notice: Subject to any disclaimer, the term of this patent is extended or adjusted under 35 U.S.C. 154(b) by 0 days.

(21) Appl. No.: 11/691,045

(22) Filed: Mar. 26, 2007

(65) Prior Publication Data

US 2007/0183728 A1 Aug. 9, 2007

Related U.S. Application Data

(62) Division of application No. 10/751,932, filed on Jan. 7, 2004, now Pat. No. 7,245,806.

(30) Foreign Application Priority Data

Jan. 7, 2003 (NL) .................................. 1022315

(51) Int. Cl.
G02B 6/02 (2006.01)

(52) U.S. Cl. ........................ 385/123; 385/124

(58) Field of Classification Search ................. None
See application file for complete search history.

(56) References Cited

U.S. PATENT DOCUMENTS

| | | | |
|---|---|---|---|
| 3,909,110 A | 9/1975 | Marcuse | |
| 4,038,062 A | 7/1977 | Presby | |
| 4,176,911 A | 12/1979 | Marcatili et al. | |
| 4,212,660 A | 7/1980 | Maurer | |
| 5,298,047 A | 3/1994 | Hart, Jr. et al. | |
| 5,848,204 A | 12/1998 | Wanser | |
| 5,897,680 A | 4/1999 | Geertman | |
| 5,916,495 A | 6/1999 | Nonaka et al. | |
| 5,992,181 A | 11/1999 | Geertman | |
| 6,298,183 B1 | 10/2001 | Yamauchi et al. | |
| 6,422,043 B1 | 7/2002 | DiGiovanni et al. | |
| 6,430,342 B1 | 8/2002 | Kim et al. | |
| 6,535,678 B1 | 3/2003 | Yamauchi et al. | |
| 6,539,154 B1 | 3/2003 | Berkey et al. | |
| 6,542,679 B2 | 4/2003 | DiGiovanni et al. | |
| 6,568,220 B1 | 5/2003 | Paek et al. | |
| 6,724,963 B2 | 4/2004 | Neuberger | |
| 7,245,806 B2 | 7/2007 | Breuls et al. | |
| 2001/0019643 A1 | 9/2001 | Yamauchi et al. | |
| 2002/0003926 A1 | 1/2002 | Enomoto et al. | |
| 2004/0069018 A1 | 4/2004 | Oh et al. | |
| 2004/0112090 A1 | 6/2004 | Lee et al. | |
| 2007/0183728 A1 | 8/2007 | Breuls et al. | |

FOREIGN PATENT DOCUMENTS

| | | |
|---|---|---|
| EP | 1 101 744 | 5/2001 |
| EP | 1 116 968 | 7/2001 |
| EP | 1 319 636 | 6/2003 |
| GB | 2 213 142 | 8/1989 |
| GB | 2 347 759 | 9/2000 |
| JP | 2001 287927 | 10/2001 |
| WO | WO 02/32820 | 4/2002 |

OTHER PUBLICATIONS

Dutch Search Report in corresponding Dutch Application No. 1022315, dated Oct. 2, 2003.
International Search Report in corresponding International Application No. PCT/NL2004/000004, mailed on Jun. 17, 2004.
International Preliminary Report on Patentability in corresponding International Application No. PCT/NL2004/000004, completed on Apr. 25, 2005.
English translation of First Chinese Office Action for corresponding Chinese Application No. 200480003815.X, dated Sep. 29, 2006.
English translation of Second Chinese Office Action for corresponding Chinese Application No. 200480003815.X, dated Jul. 13, 2007.

*Primary Examiner*—Tina M Wong
(74) *Attorney, Agent, or Firm*—Summa, Allan & Addition, P.A.

(57) ABSTRACT

An optical fibre for propagating a signal in different modes, including a longitudinal length "a" of a change in the tension buildup in the optical fibre and a longitudinal distance "L" between two such changes are in accordance with the equation, a<=0.5 L, for at least part of the optical fibre.

7 Claims, No Drawings

METHOD OF MANUFACTURING AN OPTICAL FIBRE HAVING VARIATIONS IN THE REFRACTIVE INDEX

CROSS-REFERENCE TO RELATED APPLICATIONS

This application is a division of application Ser. No. 10/751,932, filed on Jan. 7, 2004, now U.S. Pat. No. 7,245,806 and claims the benefit of priority from the prior Netherlands Patent Application No. 1022315, (filed Jan. 7, 2003), the entire contents of each of which is incorporated herein by reference.

The present invention relates to a method of manufacturing an optical fibre, which method comprises the steps of:

i) providing an optical preform, ii) heating one end of said optical preform, iii) drawing an optical fibre from the heated end of the optical preform, iv) cooling the optical fibre thus drawn in step iii), v) winding the cooled optical fibre onto a reel, with a change in the tension buildup being introduced into the optical fibre in step iv), resulting in variations in the refractive index of the optical fibre as a function of the longitudinal position.

The present invention furthermore relates to an optical fibre for propagating a signal with different modes.

The above method is known per se from U.S. Pat. No. 5,992,181 granted to the present applicant, from which US patent a method of manufacturing an optical fibre is known wherein an optical fibre drawn from a molten extremity of a preform is irradiated with radiation from a randomly pulsed laser source. The radiation that is used is UV or blue/green light, the UV light having a wavelength in the range 230-260 nm and the blue/green light having a wavelength in the range 460-520 nm. Exposure of the optical fibre to such radiation makes it possible to change the electronic structure of the dopants in the core portion of the optical fibre, such that the refractive index of the doped core material in the irradiated portion in question is locally increased. When such local changes in the refractive index are effected at irregular intervals along the length of the fibre core, a continuous mode coupling between the various polarization modes of the signal propagating within the core can be effected, which will lead to a significant reduction of the PMD.

International application WO 02/32820 relates to a method of manufacturing an optical fibre, wherein variations in the diameter are introduced along the length of the optical fibre by locally heating the optical fibre to a temperature higher than the softening temperature of the fibre by irradiating the optical fibre with laser light as it is drawn. No mention is made of a change in the tension buildup. The longitudinal distance between said variations can be expressed in kilometres. No mention is made in said document of the longitudinal length of said variations.

British patent application No. 2 213 142 describes a method of manufacturing an optical fibre, wherein periodic perturbations in the diameter or in the refractive index are introduced by heating the fibre to a temperature higher than the softening temperature of the optical fibre by irradiating it with laser light. No mention is made in said document of a change in the tension buildup, however, nor of the proportion between the longitudinal length of the changes and the longitudinal distance between two such changes.

U.S. Pat. No. 4,038,062 relates to a method of manufacturing optical fibres, wherein geometric perturbations are introduced in the longitudinal direction of the optical fibre by irradiating the optical fibre with laser light, with the fibre being heated to a temperature above the softening temperature of the fibre. No mention is made in said document of a change in the tension buildup, however, nor of the proportion between the longitudinal length of the changes and the longitudinal distance between two such changes.

Japanese patent application No. 2001 287927 relates to a method of manufacturing an optical fibre, wherein the fibre is forcibly cooled in a number of directions as it is drawn. No mention is made in said document of changes in the tension buildup, nor of the proportion between the longitudinal length of a change and the longitudinal distance between two such changes.

U.S. Pat. No. 4,176,911 relates to a method of manufacturing an optical fibre, wherein periodic perturbations in the refractive index are introduced in axial direction. No mention is made in said document of a change in the tension buildup, however. Nor is mention made of the proportion between the longitudinal length of a change and the longitudinal distance between two such changes.

U.S. Pat. No. 2001/0019643 relates to a method of manufacturing an optical fibre, wherein the fibre is alternately heated and softened through irradiation with laser light, as a result of which periodic changes in the refractive index between the core and the cladding of the optical fibre are obtained in the longitudinal direction of the optical fibre. The longitudinal length of a change is equal to the longitudinal distance between two such changes.

U.S. patent application Ser. No. 2002/003926 describes a method of manufacturing an optical fibre grating element. No mention is made in said document of a change in the tension buildup as a function of the longitudinal position of the optical fibre. Nor is mention made of the proportion between the longitudinal length of a change and the longitudinal distance between two such changes.

U.S. Pat. No. 3,909,110 relates to an optical fibre with spatial fluctuations in the refractive index. No mention is made in said document of a change in the tension buildup, nor of the proportion between the longitudinal length of a change and the longitudinal distance between two such changes.

U.S. Pat. No. 4,212,660 relates to a method of manufacturing optical waveguides, wherein the refractive index of the preform is modified by heating the same through irradiation with laser light. No mention is made in said document of a change in the tension buildup, however, nor of the longitudinal length of a change or of the longitudinal distance between two such changes.

The term "polarization mode dispersion" (PMD) relates to the dispersion of signals being transmitted through an optical fibre, caused by the double refraction in the core portion of the optical fibre. Said double refraction is caused by imperfections in the fibre, such as a slight degree of unroundness of the cross-section of the core, asymmetric lateral tensions and the like. In the situation of a perfect optical fibre in which PMD does not occur, said two modes will propagate independently of each other at a common velocity.

In the past attempts have been made to eliminate the aforementioned phenomenon of PMD by coupling the two polarization modes. Thus a method is known from U.S. Pat. Nos. 5,897,680 and 5,298,047 in which rotation or spin is impressed upon the optical fibre by contacting the optical fibre, which is still slightly plastic at that point, with wheels moving back and forth, after which the spin is frozen into the fibre by cooling the optical fibre. One drawback OT such a method, in which there is mechanical contact with the optical fibre, is the fact that the stability of the fibre drawing process, during which the optical fibre is transported at very high velocities, decreases. Such instability generally manifests itself in the form of vibration of the optical fibre, which may lead to problems with regard to the application of a protective coating, or which may even lead to fracture of the optical fibre. Thus it has become apparent that it is difficult to effectively reduce the PMD at high drawing velocities in excess of about 15 m/sec when such mechanical methods are used. One drawback of U.S. Pat. No. 5,992,181 as discussed above is the fact that, in addition, an undesirable additional attenuation of the signal to be transmitted takes place as a result of stable, excited dopant states being effected, in particular through irradiation.

A large number of different modes can propagate in a so-called multimode fibre. In practice it is desirable for all the modes to propagate through the optical fibre simultaneously, so that a specific pulse introduced into an optical fibre at the beginning thereof subsequently exhibits a minimum amount of broadening at the end of such a fibre. In order to obtain such a result, a multimode fibre has a gradient index profile according to the general formula:

$$n(r) = n_1 * \sqrt{\left(1 - \frac{n_1^2 - n_2^2}{n_1^2} * \left(\frac{r}{a}\right)^a\right)}$$

wherein:
n(r) = the refractive index as a function of the radius,
$n_1$ = the refractive index in the central part of the core,
$n_2$ = the refractive index at the edge of the core,
r = the radial position, and
a = the radius of the core.

If the profile parameter α has an optimum value, the differences in delay between the various modes will be minimal. Since the refractive index depends on the wavelength that is used, different wavelengths have different optimum α-values. The difference in the optimum α-value between two widely used wavelengths for signal transmission in multimode fibres, viz. 850 nm and 1300 nm, amounts to about 0.06. This means that the minimisation of the differences in delay at a wavelength of 850 nm will lead to larger differences in delay at a wavelength of 1300 nm, and vice versa. The selection of an optimum α-value at an intermediate wavelength, e.g. 1100 nm, will be a compromise, so that the differences in delay will be acceptable in practice, albeit not optimal, both at a wavelength of 850 nm and at a wavelength of 1300 nm. Consequently, it is desirable to manufacture multimode fibres having optimum characteristics over the broadest possible wavelength range.

In practice it has furthermore become apparent that the refractive index profiles are not always in accordance with the above formula. Thus, small differences in the refractive index profile may lead to excessive differences in delay. In addition, it is difficult to maintain a constant value of said refractive index profile along a sufficient length in the preform, as a consequence of which only part of the optical fibres obtained from such a preform will comply with certain quality requirements. Thus it is desirable that a method of manufacturing optical fibres be available which makes less stringent demands on the refractive index profile, but by means of which optical fibres can be obtained in which the differences in delay between the propagating modes are sufficiently minimal.

In order to obtain minimum differences in delay between the various propagating modes, it is known to mix the modes in a multimode fibre. Thus it is known from U.S. Pat. No. 4,038,062 to promote mode mixing in multimode fibres, wherein geometric perturbations are introduced in the longitudinal direction of the optical fibre. It should be understood, however, that the geometric perturbations mentioned therein have a negative influence on the diameter of the optical fibre, to the effect that serious problems arise in practice when coupling optical fibres, in which case stringent tolerances apply.

From European patent application No 1 101 744 there is furthermore known a method of spinning a non-circularly symmetric optical fibre for the purpose of promoting mode mixing in a multimode fibre.

The object of the present invention is thus to effect mode coupling between two orthogonal modes of a propagating signal in single mode fibres, so as to reduce the polarization mode dispersion (PMD) in an effective manner.

Another object of the present invention is to promote mode mixing between the various modes in a multimode fibre, as a result of which differences in delay between such modes are reduced.

Another object of the present invention is to provide an multimode-type optical fibre having a DMD-value which is considerably lower than that of the optical fibres that are known from the prior art.

Yet another object of the present invention is to provide a method of obtaining an optical fibre, wherein variations in the refractive index are introduced into the optical fibre as a function of the longitudinal position, with the diameter of the optical fibre remaining substantially the same.

According to the present invention, the method as referred to in the introduction is characterized in that the change in the tension buildup in step iv) is effected by locally heating the optical fibre to a temperature ranging between the annealing temperature and the softening temperature of the optical fibre.

The present inventors have thus found that mode coupling between two orthogonal modes of the propagating signal in a single mode fibre can take place by introducing short local refractive index differences into an optical fibre, so as to effectively reduce the polarization mode dispersion (PMD) in this manner. Moreover, it has become apparent that the use of the present method promotes the mixing between the various modes in a multimode fibre, so that the differences in delay between the various modes are reduced.

The introduction of such a refractive index change into an optical fibre by locally reheating the optical fibre during the cooling stage of the drawing process causes a thermal tension to be locally frozen into the optical fibre, which will lead to a different refractive index value. Said heating preferably takes place at a temperature higher than the annealing temperature viz. a temperature at which the viscosity value is about $10.^{12.4}$ Pa.s, but lower than the softening temperature at which the viscosity value is about $10.^{6.65}$ Pa.s.

Heating of the optical fibre to a temperature below the softening temperature prevents the occurrence of undesirable fluctuations in the diameter of the optical fibre. Such fluctuations are disadvantageous, because the optical fibre must comply with specific standards, so that the optical fibre can be welded and connected to connectors.

It is in particular preferable for the local heating as carried out in step iv) to take place at a position where the optical fibre has not cooled down to a temperature below 150° C. yet.

Preferably, pulsating laser light in the infrared wavelength range, viz. 8-12 μm, in particular from a $CO_2$ laser, is used for effecting the desired local heating.

The incident laser light will include a straight angle with the longitudinal axis of the optical fibre to be heated in that case.

Preferably, said local heating takes place asymmetrically with respect to the fibre circumference. This is understood to mean that said heating does not take place in a circularly symmetrical manner around the fibre circumference, but that said heating takes place at several separate positions around the circumference of the optical fibre. To that end, the optical fibre can be exposed to light from one or more lasers on various sides. It is in particular desirable to have said local heating take place by irradiating the optical fibre with laser light on one side thereof.

In order to achieve an effective mode coupling or mode mixing, it is in particular desirable to introduce the successive local perturbations in the refractive index value into the optical fibre from different radial positions. In a specific embodiment it is thus possible to effect the local heating by changing the position of the incident laser light on the optical fibre with respect to the optical fibre.

In a specific embodiment it is moreover desirable to effect said local heating by changing the position of the surface of the optical fibre to be irradiated with respect to the incident laser light. This can be achieved by having the incident laser light on a rotating mirror to reflect to various mirrors surrounding the optical fibre, for example. It is also possible, however, to irradiate the optical fibre from a fixed position, in which case the optical fibre is rotated with respect to said fixed position.

In a preferred embodiment, the longitudinal length "a" of a change in the tension buildup in the optical fibre and the longitudinal distance "L" between two such changes are in accordance with the following equation:

$a <= 0.5L$ for at least part of the optical fibre.

The change in the refractive index results in mode coupling, causing the PMD-value to decrease in the case of a single mode fibre and the bandwidth to increase in the case of a multimode fibre. In the longitudinal length "a" of an asymmetrical refractive index change, however, an increase of the PMD-value in the case of a single mode fibre and a decrease of the bandwidth in the case of a multimode fibre occur. It is important, therefore, that the longitudinal length "a", with a change in the tension buildup of the optical fibre, is shorter than the longitudinal length "L" between two such changes. The inventors have found that the negative effects of the increase in the PMD-value or the decrease of the bandwidth are eliminated at $<= 0.5L$ by the positive effects of the mode coupling.

A distinct reduction in the PMD-value (in the case of a single mode fibre) or a distinct increase in the bandwidth (in the case of a multimode fibre) is observed if "a" and "L" are in accordance with the following equation:

$a <= 0.2L$

The table shows the PMD-reduction factors at different proportions of the longitudinal length "a" of a change and the longitudinal distance "L" between two such changes.

The PMD-reduction factor is defined as the proportion between the PMD-value of a single mode optical fibre into which no change in the tension buildup has been introduced and the PMD-value of a single mode optical fibre into which a change in the tension buildup has been introduced.

TABLE 1

| a/L | PMD-reduction factor |
|---|---|
| 1 | 0.7 |
| 0.75 | 0.9 |
| 0.5 | 1 |
| 0.4 | 1.1 |
| 0.3 | 1.3 |
| 0.2 | 1.5 |

Using $CO_2$ lasers, it is possible, therefore, to effectively reduce the PMD-value for single mode optical fibres even at high drawing velocities upwards of about 15 m/sec. As already indicated before, it is very difficult to effectively reduce the PMD-value at drawing velocities upwards of about 15 m/sec when using a conventional method of PMD-reduction, in which mechanical contact takes place.

The present method has furthermore appeared to be very effective in promoting mode mixing in multimode optical fibres. The use of the present method makes it possible on the one hand to lessen the requirements that are made of the so-called graded index profile and on the other hand to obtain optical fibres having improved transmission characteristics. Furthermore it has become apparent that the mode mixing does not depend on the wavelength, so that optical fibres having improved transmission characteristics over a wide wavelength range can be obtained.

The present invention further relates to an optical fibre for propagating a signal in different modes, which fibre is characterized in that the longitudinal length "a" of a change in the tension buildup in the optical fibre and the longitudinal distance "L" between two such changes is in accordance with the following equation:

$a <= 0.5L$ at least for part of the optical fibre,

In a special embodiment, the longitudinal length "a" of a change in the tension buildup in the optical fibre and the longitudinal distance "L" between two such changes is in accordance with the following equation:

$a <= 0.2L$ at least for part of the optical fibre.

It will be apparent to those skilled in the art that in the case of propagation of a signal in a single mode fibre, the term "different modes" refers to the two polarization modes propagating through the fibre.

In order to accomplish the objects of the present invention, the maximum PMD-value for a multimode fibre, optimised in the 850 nm wavelength range, is preferably 0.35 at most. The 850 nm wavelength range is understood to be a range from 810-890 nm.

More in particular, the maximum DMD-value for a multimode fibre, optimised in the 1100 nm wavelength ranges is preferably 0.8 at most. The 1100 nm wavelength range is understood to be a range from 780-1310 nm.

The present invention further relates to a single mode optical fibre whose PMD-value is 0.06 ps/$\sqrt{km}$ at most.

The present invention in particular relates to an optical fibre having a PMD-reduction factor greater than or equal to 1, which PMD-reduction factor is defined as described above.

The present invention will now be explained in more detail by means of a number of examples, in which connection it should be noted, however, that the present invention is by no means limited to such special examples.

EXAMPLES 1-2 AND COMPARATIVE EXAMPLE 1 FOR SINGLE MODE FIBRE

A single mode optical fibre was drawn by carrying out the present method steps as described above, using a drawing velocity of 20 m/sec and a pulsating $CO_2$ laser at a frequency of 100 Hz. The optical fibre was rotated with respect to the incident laser light, using a so-called scrambler. The above operations were repeated, with this difference that a $CO_2$ laser source having a variable frequency in the 25-200 Hz range was used. The PMD-value in the single mode fibre, using irradiation with laser light, was 0.06 ps/$\sqrt{}$km (example 1), whilst a fibre not treated with a $CO_2$ laser had a PMD-value of 0.1 ps/$\sqrt{}$km (comparative example 1). In the experiments carried out with a variable frequency, the PMD-value could be reduced even further to a value of 0.04 ps/$\sqrt{}$km (example 2).

EXAMPLES 3-6 AND COMPARATIVE EXAMPLES 2-5 FOR MULTIMODE FIBRE

A multimode fibre was drawn, using the present method, with the fibre being exposed to light from a pulsating $CO_2$ laser after exiting the furnace. Corresponding experiments were repeated for a multimode fibre, with this difference that no laser light was used. In the Table 2 below, the DMD-value is the maximum DMD-value at one of the wavelengths in the measured range.

TABLE 2

| Example No. | Wavelength | DMD-value (ps/m) |
|---|---|---|
| Example 3 according to the invention | 850 | 0.85 |
| Comparative example 2 | 850 | 1 |
| Example 4 according to the invention | 810-890 | 0.33 |
| Comparative example 3 | 810-890 | 0.4 |
| Example 5 according to the invention | 1300 | 0.5 |
| Comparative example 4 | 1300 | 0.6 |
| Example 6 according to the invention | 780-1310 | 0.7 |
| Comparative example 5 | 780-1310 | 0.9 |

The DMD-values were measured in accordance with the Fibre Optic Test Procedure (FOTP-220).

Example 4 according to the invention and comparative example 3 concerned an optical fibre having a gradient index profile in accordance with the aforesaid formula, optimised for a wavelength of 850 nm. Example 6 according to the invention and comparative example 5 concerned an optical fibre having a gradient index profile in accordance with the aforesaid formula, optimised for a wavelength of 1100 nm. Examples 3 and 5 according to the invention and comparative examples 2 and 4 concerned fibres having non-optimised gradient index profiles.

From the above experiments it is apparent that the PMD-value of a single mode fibre can be significantly reduced, in particular to a value lower than 0.06 ps/$\sqrt{}$km, by using the present method. In addition, the use of the present method makes it possible to achieve a significant reduction of the DMD-value of a multimode fibre in comparison with an optical fibre that has not been treated with $CO_2$ laser light.

The invention claimed is:

1. An optical fibre for propagating a signal in different modes, comprising:
    a longitudinal length "a" of a change in the tension buildup in the optical fibre and a longitudinal distance "L" between two such changes are in accordance with the following equation:

$a<=0.5L$ for at least part of the optical fibre.
2. An optical fibre according to claim 1, wherein a<=0.2 L.
3. An optical fibre according to claim 1, further comprising:
    a maximum DMD-value for a multimode fibre, optimised in a 850 nm wavelength range, is 0.35 at most.
4. An optical fibre according to claim 1, further comprising:
    a maximum DMD-value for a multimode fibre, optimised in a 1100 nm wavelength range, is 0.8 at most.
5. An optical fibre according to claim 1, further comprising:
    a PMD-value for a single mode fibre is 0.06 ps/$\sqrt{}$km at most.
6. An optical fibre according to claim 1, further comprising:
    a PMD-reduction factor is greater than or equal to 1, wherein the PMD-reduction factor is defined as a proportion between a PMD-value of a single mode optical fibre into which no change in the tension buildup has been introduced and a PMD-value of a single mode optical fibre into which a change in the tension buildup has been introduced.
7. An optical fibre according to claim 6, wherein the PMD-reduction factor is greater than or equal to 1.5.

* * * * *

UNITED STATES PATENT AND TRADEMARK OFFICE
CERTIFICATE OF CORRECTION

PATENT NO. : 7,394,959 B2  Page 1 of 1
APPLICATION NO. : 11/691045
DATED : July 1, 2008
INVENTOR(S) : Breuls et al.

It is certified that error appears in the above-identified patent and that said Letters Patent is hereby corrected as shown below:

In the Title Page

INID Code 74 reads "Summa, Allan & ~~Addition~~, P.A." and should read: Summa, Allan & Additon, P.A.

Column 2, line 67 reads "fibre by cooling the optical fibre. One drawback ~~OF~~ such a," and should read: "fibre by cooling the optical fibre. One drawback of such a"

Column 6, line 56, reads "mode fibre, optimised in the 1100 nm wavelength ~~ranges~~ is," and should read: "mode fibre, optimised in the 1100 nm wavelength range is"

Signed and Sealed this

Twenty-fourth Day of March, 2009

JOHN DOLL
*Acting Director of the United States Patent and Trademark Office*